CALENDAR

Original Filed Jan. 18, 1957

INVENTORS
ARNOLD KESE
ZENTA KESE
BY Eugene H. Farley
ATTY.

United States Patent Office

Re. 24,711
Reissued Oct. 6, 1959

24,711

CALENDAR

Arnold Kese and Zenta Kese, Tacoma, Wash.

Original No. 2,807,898, dated October 1, 1957, Serial No. 634,905, January 18, 1957. Application for reissue June 23, 1958, Serial No. 745,794

3 Claims. (Cl. 40—108)

Matter enclosed in heavy brackets [ ] appears in the original patent but forms no part of this reissue specification; matter printed in italics indicates the additions made by reissue.

This invention relates to calendars and pertains particularly to calendars of the class which may be mounted on a cylindrical body, for example on a pencil or a pen.

It is the general object of this invention to provide a calendar of the class described in our U.S. Patent No. 2,767,496, which calendar may be mounted conveniently on the body of a writing instrument such as a pencil or pen.

It is another object of this invention to provide a calendar which requires but little space and accordingly may be mounted on a pencil or a pen, but which contains information sufficient to be used for a span of one or two years.

It is still another object of this invention to provide a calendar which always is available for use when writing with a pen or pencil.

Still a further object of this invention is the provision of a pen or pencil calendar of simplified construction which may be adjusted easily and accurately for ascertaining the current date.

It is another object of this invention to provide a calendar for pens and pencils on which Sundays and the months having the same number of days may be indicated distinctively.

Still another object of this invention is the provision of a calendar which is of simple construction and low cost, and which may be mounted on a cylindrical body of small dimensions such as a pencil or pen.

The manner in which the foregoing and other objects of this invention are accomplished will be apparent from the accompanying specification and claims, considered together with the drawings wherein like numerals represent like parts and wherein:

Generally stated the calendar of our invention comprises a substantially cylindrical body having a circumferential guideway thereabout. The body is divided into circumferential bands or stripes. The first of these is divided into seven vertical columns each inscribed with the names of the months of the year which start on the same day of the week. The second circumferential body band is divided into seven columns each bearing the name of a day of the week. The third circumferential body band may be blank, or colored a distinctive color.

The sleeve also is divided into circumferential bands or stripes, the first of which substantially registers with the first body band but is colored a different color and has a window of substantially the same width as the columns on the body band. A second circumferential sleeve band is adjacent the first and in substantial registration therewith. It is transparent so that the underlying second body band may be viewed clearly. The third circumferential sleeve band substantially registers with the third body band and is inscribed with a calendar, the columns of which may be aligned, upon rotation of the sleeve, with the columns on the body for setting the calendar.

Considering the foregoing in greater detail and with particular reference to the drawings:

Although the calendar of our invention may be mounted on any body of suitable dimensions and configuration, it is designed particularly for mounting on a pen or pencil 10. A portion 12 of the body is of reduced diameter and separated from the rest of the pencil by guideways 14, 16, the purpose of which will appear hereinafter.

Figure 3:
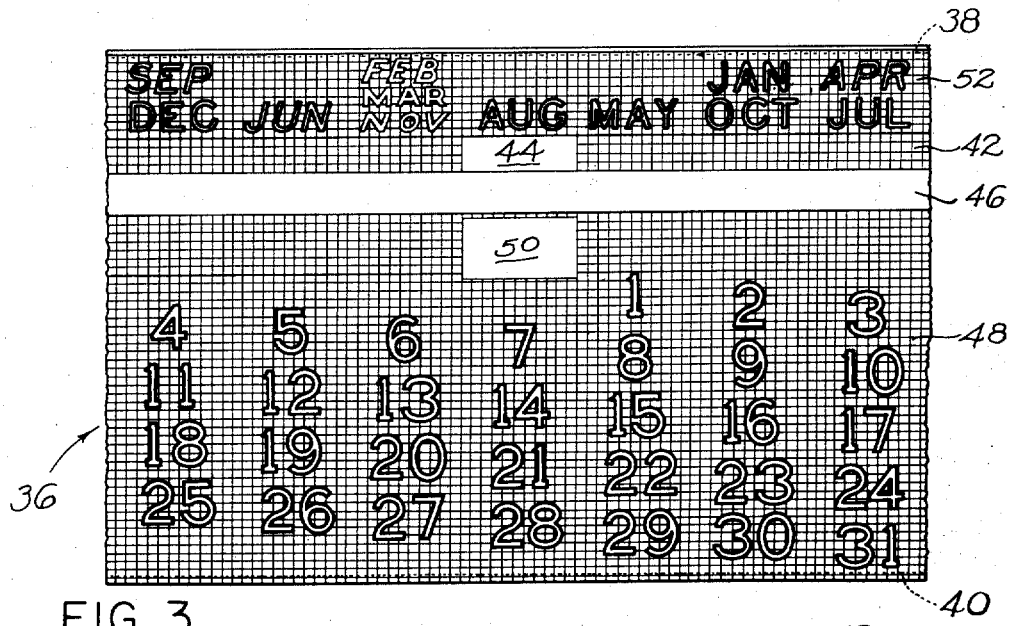
Fig. 3 is a plan view of a sleeve which overlies the bands of Fig. 2, opened out for complete inspection.
Figure 2:
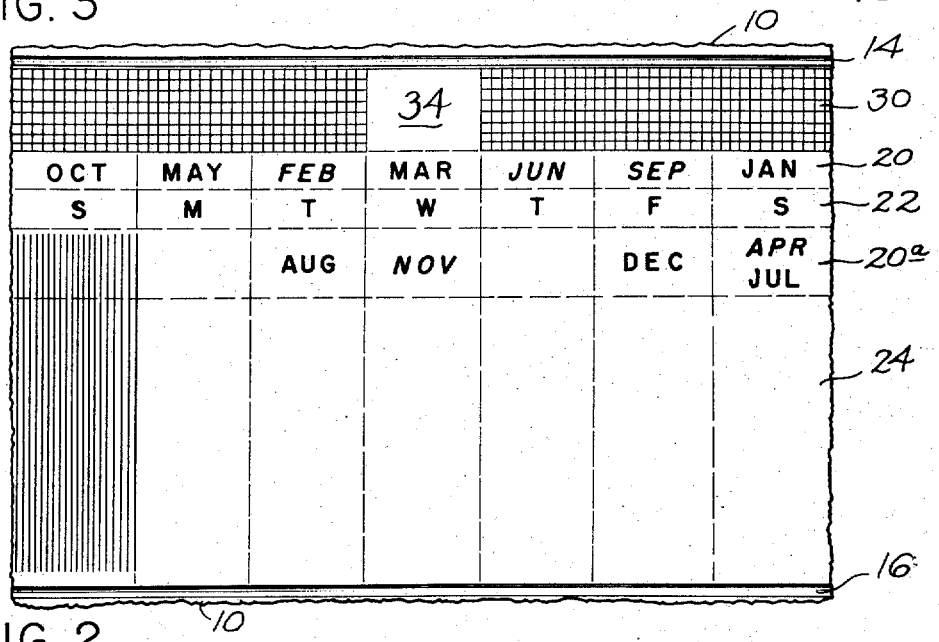
Fig. 2 is a plan view of bands inscribed on the body of the pencil of Fig. 1, opened out so they may be viewed completely.
Figure 1:
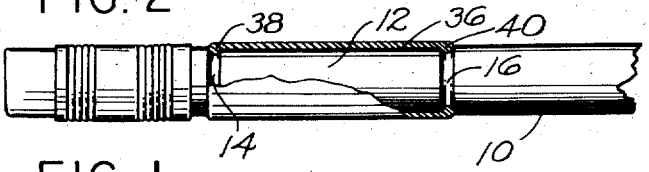
Fig. 1 is a fragmentary plan view of a pencil bearing the presently described calendar.

The recessed portion of the pencil body is marked off into the plurality of circumferential bands or stripes illustrated in Fig. 2. The first of these, band 20, is divided into seven vertical columns each of which is inscribed with the names of the months of the year which start on the same day of the week. Band 20 preferably is divided circumferentially to form a second band 20a on which some of the months may be placed. This serves to separate the names of the months, making the calendar shorter and more easily read. If desired, the names of the months having thirty days may be in a different color or in a different style of type from those having thirty one days, further facilitating reading of the calendar.

Recessed portion 12 of the pencil body also bears a second circumferential band or stripe 22 divided into seven vertical columns, each of which bears the name of one of the days of the week, Sunday being indicated in red, if desired.

The third circumferential band or stripe on the body is indicated at 24. It includes a substantial area which may or may not be divided into vertical columns registering with the columns of the adjacent bands. These columns all may be colored distinctively for easy setting and reading, the Sunday column, for example, being colored red. Also, the columns may be phosphoresced or covered with a multiplicity of small lenses (Scotch light), which makes it easier to use the calendar in dim light.

A fourth circumferential band or stripe 30 may be placed adjacent month band 20. The major portion of this band is colored a given color, for example black. However, at a selected location it contains an area 34, the width of one of the month columns which is colored a different color, for example white.

Mounted for rotation on body portion 12 is a sleeve 36 the ends of which are provided with beads 38, 40. These are received in guideways 14, 16 and accordingly make possible the rotation of the sleeve about the pencil body.

Sleeve 36 may be made of a clear plastic material. It is divided into circumferential bands or stripes, which preferably are imprinted on the inside of the sleeve where they are protected from dirt and closer to the inscriptions on the body for easier reading. The first of these, band 42, registers substantially with body band 20. However, the major portion of it is colored a different color, black for example. A clear window 44, the width of one of the columns then is provided for inspection of the underlying month band, one column at a time.

The second circumferential band 46 on the sleeve is clear and in substantial registration with the second body band 22. Hence it permits inspection of the days of the week thereon.

The third circumferential sleeve band 48 is in substantial registration with the third body band 24. It is inscribed with [a calendar] *the days of the month which may be transparent,* arranged in the usual manner in seven columns which may be aligned with the other columns of the calendar. A window 50, the width of one column, permits inspection of the months inscribed on band 20a of the underlying pencil body.

If desired, another band or stripe 52 may be included on the sleeve. This band is dimensioned to register with band 30 of the pencil body. The major portion of the band is colored the same color as band 30. However, letters are left clear which form the names of the months for the next succeeding year, arranged in groups according to the days on which the first day of each of the months appears. These groups then may be brought over area 34 in succession whereupon they become visible.

OPERATION

The manner of operation of the hereindescribed calendar is as follows:

When the calendar is used in the first year, for example in the year 1956, sleeve 36 is set with the selected month appearing in window 44 or window 50. The calendar then may be read in the usual manner, Sundays being clearly visible because of the red underlayment on the Sunday area of band 24, and the thirty day months being distinguishable from the thirty-one day months because of the different colors by which they are indicated. However, when it is desired to use the calendar for the next succeeding year, for example the year 1957, the month selected on sleeve band 52 is set opposite white area 34 on body band 30, whereupon the calendar may again be read in the conventional manner.

Hence it is clear that by the present invention we have provided a calendar which is readily adaptable for use on small cylindrical bodies such as pencils and pens. This calendar has several significant advantages over the calendar described in our U.S. Patent No. 2,767,496 referred to above. It is of simpler construction and includes only a single sleeve. The names of the months and the days of the week are printed directly on the pencil body. The various columns of the calendar are colored distinctively for easy reference. The calendar may be surfaced with a phosphorescent material, so that it may be seen in the dark. The information contained in the calendar is worked together so that the calendar is of narrow width and requires but little space. The information also may be arranged so that the calendar is operable for a time span of as much as two years. Also, the calendar is adjustable easily and accurately as required to obtain the dates during the various months, these being clearly displayed in distinctive colors.

It is to be understood that the form of the invention, herewith shown and described, is to be taken as a preferred embodiment of the same and that various changes in the shape, size and arrangement of parts may be made without departing from the spirit of the invention or the scope of the subjoined claims.

Having thus described our invention, we claim:

[1. A calendar comprising a substantially cylindrical body having a circumferential guideway thereabout, a first circumferential body band divided into seven columns each inscribed with the names of the months of the year starting on the same day of the week; a second circumferential body band divided into seven columns each bearing the name of a day of the week; a third circumferential body band; all of the body bands being adjacent each other with the columns thereof substantially aligned; a sleeve rotatably mounted on the guideway overlying the body bands; a first circumferential sleeve band substantially registering with the first body band, but colored differently therefrom and having therein a window of substantially the same width as the columns on the body band; a second circumferential sleeve band which is transparent and in substantial registration with the second body band; and a third circumferential sleeve band substantially registering with the third body band and inscribed with a calendar, the columns of which may be aligned, upon rotation of the sleeve, with the columns on the body for setting the calendar.]

[2. The calendar of claim 1 wherein the guideway comprises a portion of the cylindrical calendar body of reduced diameter, the circumferential body bands being inscribed on the guideway.]

[3. The calendar of claim 1 wherein the calendar numerals on the third sleeve band are transparent and wherein the area of the third body band underlying selected columns of the calendar on the third sleeve band are colored red or other distinctive color.]

[4. The calendar of claim 1 wherein the first circumferential body band and the first circumferential sleeve band are circumferentially divided into two sections positioned one on each side of the second circumferential body band, thereby permitting separation of the names of the months of the year for easy reading and conservation of space.]

[5. The calendar of claim 1 wherein the sleeve includes a fourth circumferential sleeve band overlying the body and divided into seven vertical columns each inscribed with the names of the months of the next succeeding year starting on the same day of the week.]

*6. A calendar comprising a substantially cylindrical body having a circumferential guideway thereabout, a first circumferential body band divided into seven columns each inscribed with the names of the months of the year starting on the same day of the week; a second circumferential body band divided into seven columns each bearing the name of a day of the week; a third circumferential body band; all of the body bands being adjacent each other with the columns thereof substantially aligned; a sleeve rotatably mounted on the guideway overlying the body bands; a first circumferential sleeve band substantially registerinng with the first body band, but colored differently therefrom and having therein a window of substantially the same width as the columns on the body band; the first circumferential body band and the first circumferential sleeve band being circumferentially divided into two sections positioned one on each side of the second circumferential body band, thereby permitting separation of the names of the months of the year for easy reading and conservation of space; a second circumferential sleeve band which is transparent and in substantial registration with the second body band; and a third circumferential sleeve band substantially registering with the third body band and inscribed with the days of the month, the columns of which may be aligned, upon rotation of the sleeve, with the columns on the body for setting the calendar.*

*7. A calendar comprising a substantially cylindrical body having a circumferential guideway thereabout, a first circumferential body band divided into seven columns each inscribed with the names of the months of the year starting on the same day of the week; a second circumferential body band divided into seven columns each bearing the name of a day of the week; a third circumferential body band; all of the body bands being adjacent each other with the columns thereof substantially aligned; a sleeve rotatably mounted on the guideway overlying the body bands; a first circumferential sleeve band substantially registering with the first body band, but colored differently therefrom and having therein a window of substantially the same width as the columns on the body band; a second circumferential sleeve band which is transparent and in substantial registration with the second body band; a third circumferential sleeve band substantially registering with the third body band and inscribed with the days of the month, the columns of which may be aligned, upon rotation of the sleeve,*

*with the columns on the body for setting the calendar, and a fourth circumferential sleeve band overlying the body and divided into seven vertical columns each inscribed with the names of the months of the next succeeding year starting on the same day of the week.*

*8. A writing instrument comprising a substantially cylindrical body having a circumferential guideway thereabout, at least one circumferential body band having a window portion therein; a second circumferential body band divided into seven columns each bearing the name of a day of the week, a third circumferential body band, all the body bands being adjacent each other, a transparent sleeve rotatably mounted on the guideway overlying the body bands, at least one first circumferential sleeve band divided into seven columns inscribed with month designations starting on the same day of the week, the columns in the first sleeve band each being substantially the same width as the window, the first sleeve band circumferentially registering with the first*

*body band for aligning one of the columns in the first sleeve band with the window, a second circumferential sleeve band in substantially circumferential registration with the second body band, a third circumferential sleeve band circumferentially registering with the third body band and inscribed with the days of the month the columns of which may be aligned upon rotation of the sleeve with the columns on the body for setting the calendar.*

References Cited in the file of this patent or the original patent

UNITED STATES PATENTS

| | | |
|---|---|---|
| 1,334,031 | Hahn | Mar. 16, 1920 |
| 2,584,810 | O'Kane | Feb. 5, 1952 |
| 2,702,439 | Swensson | Feb. 22, 1955 |

FOREIGN PATENTS

| | | |
|---|---|---|
| 889,995 | Germany | Sept. 14, 1953 |